United States Patent Office 2,698,346
Patented Dec. 28, 1954

2,698,346

PROCESS FOR PREPARATION OF ETHANOL FROM ACETONE

Myron B. Kratzer, Wilmington, Del., assignor to Stanolind Oil and Gas Company, Tulsa, Okla., a corporation of Delaware No Drawing. Application April 19, 1952, Serial No. 283,245

3 Claims. (Cl. 260—638)

The present invention relates to certain aspects of hydrocarbon synthesis involving the reduction of carbon monoxide with hydrogen in the presence of a suitable catalyst and, in general, pertains to a method for the interconversion of acetone and ethanol by subjecting one or the other of these compounds to conditions such as those that ordinarily prevail in the aforesaid hydrocarbon synthesis process.

An object of my invention is to provide a method whereby it is indirectly possible to alter the ratio of acetone to ethanol produced by the hydrocarbon synthesis in the event market conditions favor one of these compounds over the other. An additional object of this invention is to provide an efficient method for the conversion of acetone to ethanol.

The conditions under which reaction is effected between carbon monoxide and hydrogen by the use of a catalyst, either in the form of a fixed bed or in a fluidized condition, to produce liquid hydrocarbons together with a substantial proportion of chemicals have been described at considerable length in both the current patent and technical literature; therefore, it is considered unnecessary to set forth such conditions in detail in the present description. I wish to point out, however, that in the aforesaid synthesis one of the chief factors in determining the duration of a particular run with a given batch of catalyst has been based upon the ability of the latter to retain the desired degree of activity and fluidity in spite of the severe conditions encountered in the reactor in which hydrocarbon synthesis occurs. Thus, after the synthesis reactor has been on stream for a period of days or weeks, the density of the fluidized catalyst bed is observed to decrease from an initial value of from about 90 to 100 lbs. per cu. ft. to a density of from about 15 to 30 lbs. per cu. ft. When the latter condition prevails, continued operation becomes highly uneconomical and, as a result, the reactor must be shut down, the spent catalyst withdrawn and dumped or sent to a regenerator and a fresh bath of active catalyst charged to the reactor. Simultaneously with the reduction in catalyst density there occurs a deposition of carbonaceous matter on the surface of the catalyst, some of which is elemental carbon and some of which consists of high melting waxes produced during the reaction. The extent to which this carbonaceous material is found on the spent catalyst will vary, but I have observed that elemental carbon alone is generally deposited thereon in amounts of from about 2 up to about 25 to 30 per cent of the total mass of catalyst and carbonaceous matter. In general, however, after the quantity of deposited carbon reaches a value of 8 or 10 per cent, it is not considered economical to continue the synthesis. The concentration of carbonaceous material on the catalyst such as, for example, free carbon, wax, etc., is not necessarily an unqualified criterion of catalyst activity. Thus, I have frequently found that carbon monoxide conversion may drop as much as 25 to 30 per cent when operating with a catalyst which on subsequent analysis showed free carbon to be present to the extent of only from about 2 to 5 per cent. It is known that during synthesis of hydrocarbons in accordance with this process, when employing an iron catalyst, an iron carbide having the formula $Fe_2C$ is produced. A number of theories attempting to explain the role of the catalyst in this synthesis have postulated that the catalyst, before it becomes suitably activated to promote the desired reaction, is first converted into the form of a carbide. The existence of carbidic iron in the form of $Fe_2C$ in the active synthesis catalyst has been definitely proved. Whether or not the various forms of carbides produced during synthesis are converted from an active state to a form that functions as an inhibitor of the desired reaction or whether, under certain conditions of operation, the catalysts converted into a physical form which is inactive, is not known. As pointed out above, however, I have observed in some instances that under normal synthesis conditions, i. e., pressures of 250–400 p. s. i., temperatures of about 600° to 680° F., and a feed gas containing about 90 to 95 per cent hydrogen and carbon monoxide in a ratio of 2:1, after a few hundred hours of operation the catalyst becomes inactive, although subsequent analysis thereof indicates less than 10 per cent carbonaceous matter to be present.

According to my invention, I have devised a process whereby acetone can be converted to ethanol by contacting the former with a suitable hydrocarbon synthesis catalyst, such as, for example, reduced mill scale in the form of a fluidized bed to give high conversions and yields of ethanol in accordance with the reaction:

$$CH_3COCH_3 \rightarrow CH_3CH_2OH + C$$

In this connection, the reaction involving the conversion of acetone to ethanol may be promoted by the use of a fresh hydrocarbon synthesis catalyst. In carrying out the process of my invention, acetone vapors are allowed to contact the fresh hydrocarbon synthesis catalyst in a reaction zone at a temperature ranging from about 540° to about 700° F., for example, from about 540° to about 625° F. In converting acetone to ethanol in the presence of the hydrocarbon synthesis catalyst, it is preferable, although not essential, to effect this operation by introducing acetone vapor upwardly through a fluidized bed of the catalyst. In carrying out this step of the invention, the acetone vapor is introduced into the reaction zone at a rate sufficient to maintain the catalyst bed in a fluidized condition such as, for example, at the rate of from about 0.1 to about 2.0 feet per second. Under the conditions thus provided, acetone is readily converted into ethanol. In producing ethanol from acetone in the manner described above, the catalyst may be regenerated by any one of several methods already known to the art, including the procedure described in my U. S. Patent No. 2,632,015.

The conversion of acetone to ethanol accomplished in accordance with my invention may be further illustrated by the following specific example.

Example

A quantity of iron hydrocarbon synthesis catalyst amounting to 247 lbs. was introduced into a suitable reactor at a temperature of about 680° F. The carbon content of the catalyst, based on the weight of the iron, prior to treatment was 0.3 per cent. Acetone vapor was next introduced into the reactor at a linear velocity of about 1.5 ft. per second in order to maintain the catalyst bed in a fluidized state. Under these conditions, the molar ratio of ethanol to acetone withdrawn from the reactor in the effluent gases was 2.0. Introduction of acetone was halted after analysis of the catalyst indicated that the carbon content had been increased to 11 per cent, based on the weight of iron. During this period of treatment a total of 82 lbs. of ethanol was produced requiring 310 lbs. of acetone which included the quantity of acetone converted, i. e., 103 lbs., together with the quantity of acetone required for recycle, i. e., 207 lbs.

To demonstrate the ratio of ethanol to acetone present in the tail gas at different reaction temperatures, a series of runs was made in which the same conditions were employed, with the exception of temperatures, as were utilized in the foregoing example. The results obtained appear in tabular form below.

| Temperature, ° F. | Molar Ratio of Ethanol to Acetone in Tail Gas |
|---|---|
| 560 | 14.7 |
| 580 | 11.62 |
| 600 | 7.15 |
| 620 | 5.27 |
| 640 | 3.71 |
| 660 | 2.63 |
| 680 | 2.00 |

It will be recognized by those skilled in the art to which my invention is directed that numerous alterations or modifications may be made in the process herein generally set forth without departing from the scope of said invention. It is to be further understood that while the conversion of acetone to ethanol in accordance with my invention can, as mentioned above, be best explained on the assumption that the principal reaction involves removal of a carbon atom from the acetone molecule in the form of free carbon, my invention is not limited to any particular theory or explanation as to how or in what manner the results claimed herein are achieved. On the contrary, the process of my invention is concerned broadly with the conversion of acetone to ethanol in the presence of any of the well known hydrocarbon synthesis catalysts.

This is a continuation-in-part of my copending application, U. S. Serial No. 101,994, filed June 29, 1949, now U. S. Patent No. 2,632,015.

What I claim is:

1. In a process for converting acetone to ethanol the step which comprises contacting acetone at temperatures of from about 540° to about 700° F. with a fresh iron hydrocarbon synthesis catalyst.

2. In a process for converting acetone to ethanol the step which comprises contacting acetone at temperatures of from about 540° to about 625° F. with a fluidized bed of a finely divided fresh iron hydrocarbon synthesis catalyst.

3. In a process for converting acetone to ethanol the steps which comprise contacting acetone at a temperature of from about 540° to about 625° F. with a fluidized bed of a finely divided fresh iron hydrocarbon synthesis catalyst and removing from the reaction zone a vaporous mixture containing ethanol.

References Cited in the file of this patent

UNITED STATES PATENTS

| Number | Name | Date |
|---|---|---|
| 1,663,350 | Roka | Mar. 20, 1928 |
| 2,632,015 | Kratzer | Mar. 17, 1953 |